(12) United States Patent
Pundi Ananth et al.

(10) Patent No.: US 12,238,390 B1
(45) Date of Patent: *Feb. 25, 2025

(54) ENHANCED GENERATION AND SELECTION OF VIDEO CLIPS FROM STILL FRAME IMAGES

(71) Applicant: Amazon Technologies, Inc., Seattle, WA (US)

(72) Inventors: Shilpa Pundi Ananth, Chennai (IN); Sai Sree Harsha, Tumakuru (IN); Pooja Ashok Kumar, Bangalore (IN); Yashal Shakti Kanungo, Seattle, WA (US); Sumit Negi, Bangalore (IN); Brittney C. Gannon, Clinton, WA (US); Lauren K. Johnson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,569

(22) Filed: Dec. 29, 2023

Related U.S. Application Data

(63) Continuation of application No. 17/955,295, filed on Sep. 28, 2022, now Pat. No. 11,917,266.

(51) Int. Cl.
*H04N 21/218* (2011.01)
*G06V 10/74* (2022.01)
(Continued)

(52) U.S. Cl.
CPC ....... *H04N 21/8153* (2013.01); *G06V 10/761* (2022.01); *H04N 5/2628* (2013.01); *H04N 19/46* (2014.11); *H04N 21/812* (2013.01)

(58) Field of Classification Search
None
See application file for complete search history.

(56) References Cited

U.S. PATENT DOCUMENTS

| 2010/0091113 A1* | 4/2010 | Morioka | H04N 5/147 |
| | | | 348/207.1 |
| 2021/0117471 A1* | 4/2021 | Rav-Acha | G06F 16/7837 |
| 2021/0272599 A1* | 9/2021 | Patterson | G06N 3/08 |

OTHER PUBLICATIONS

Christoph Feichtenhofer, "X3D: Expanding Architectures for Efficient Video Recognition" Facebook AI Research (FAIR), Apr. 9, 2022, 14 pages.
(Continued)

*Primary Examiner* — Brian T Pendleton
*Assistant Examiner* — Jean D Saint Cyr
(74) *Attorney, Agent, or Firm* — Eversheds Sutherland (US) LLP

(57) ABSTRACT

Devices, systems, and methods are provided for generating and selecting video clips for inclusion in video sequences based on still frame images. A method may include encoding first embeddings for a first video including first images of an item at a first scene, the first embeddings indicative of features of the first scene; encoding second embeddings for a second video including second images of the item at a second scene, the second embeddings indicative of features of the second scene; encoding third embeddings for the first video, the third embeddings indicative of features of a first type of camera shot used for the first images; encoding fourth embeddings for the second video, the fourth embeddings indicative of features of a second type of camera shot used for the second images; and generating, based on the first, second, third, and fourth embeddings, a video sequence for the item.

20 Claims, 16 Drawing Sheets

(51) Int. Cl.
    *H04N 5/262*     (2006.01)
    *H04N 19/46*     (2014.01)
    *H04N 21/222*     (2011.01)
    *H04N 21/235*     (2011.01)
    *H04N 21/488*     (2011.01)
    *H04N 21/6379*     (2011.01)
    *H04N 21/81*     (2011.01)

(56) References Cited

OTHER PUBLICATIONS

Min Seok Lee et la., "Tracer: Extreme Attention Guided Salient Object Tracing Network" School of Industrial and Management Engineering, Korea University, Jun. 27, 2022, 12 pages.
Prannay Khosla et al., "Supervised Contrastive Learning" 34th Conference on Neural Information Processing Systems, Mar. 10, 2021, 23 pages.
Ting Cllen et al., "A Simple Framework for Contrastive Learning of Visual Representations" Jul. 1, 2022 20 pages.
Men-Li Sllih et al., "3D Photography using Context-aware Layered Depth in painting" Jun. 10, 2022, 15 pages.

\* cited by examiner

ENHANCED GENERATION AND SELECTION OF VIDEO CLIPS FROM STILL FRAME IMAGES

CROSS-REFERENCE TO RELATED PATENT APPLICATION(S)

This application is a continuation of U.S. Non-Provisional application Ser. No. 17/955,295, filed on Sep. 28, 2022, the disclosure of which is hereby incorporated herein by reference in its entirety.

BACKGROUND

Videos are becoming a preferred form of advertisement and content consumption. However, some products may not have available videos to use in advertisements.

Figure 1:
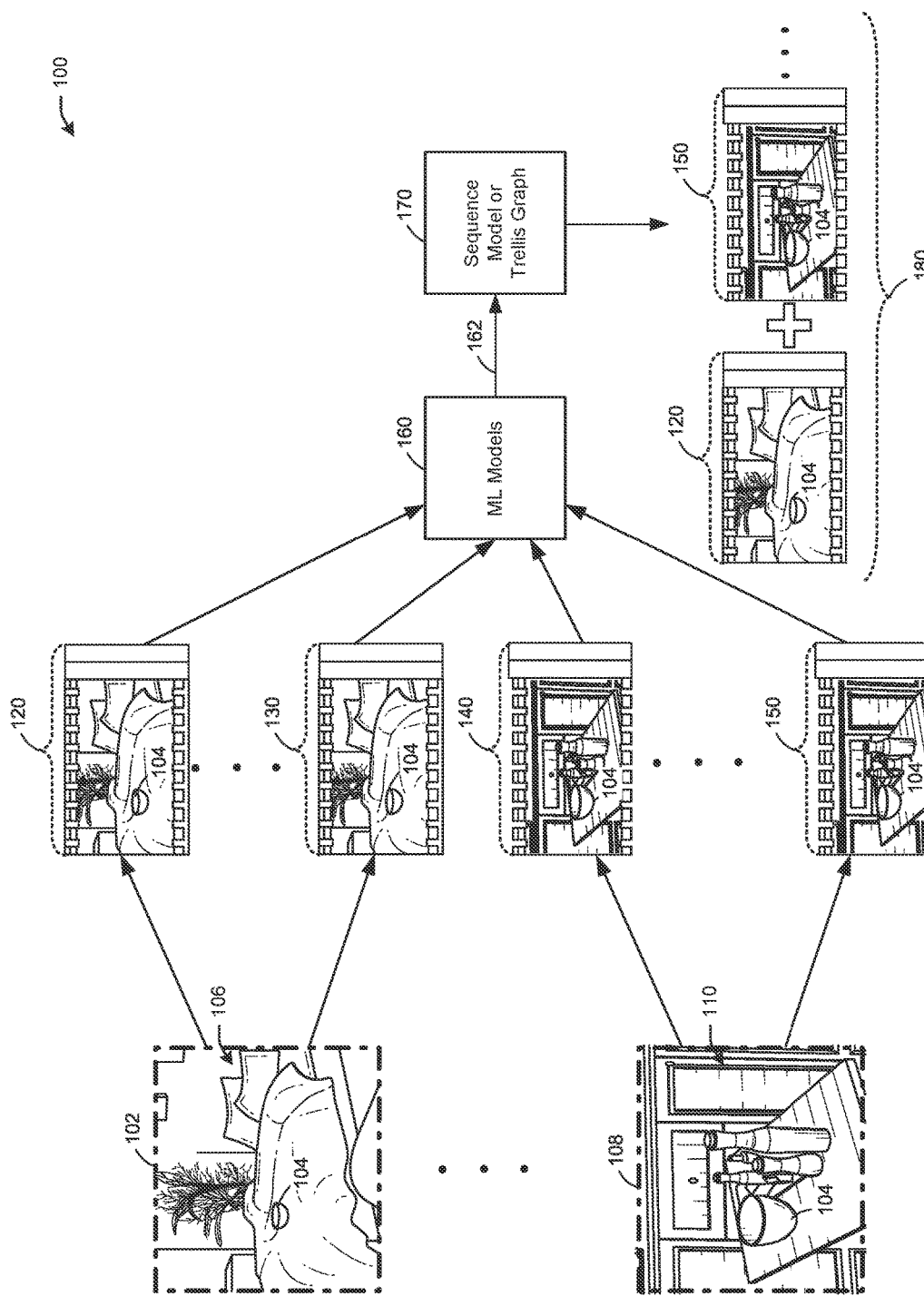
FIG. 1 illustrates an example multi-stage learning process for generating and selecting video clips from still frame images, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for generating and selecting video clips from still frame images.

Some items, such as products available for purchase, may have images available for prospective buyers to see them. In many cases, brands already have a rich library of images available for their products in different indoor, outdoor, and other lifestyle settings.

Product videos increase retention of a message compared to image or text, and therefore increase a buyer's purchase intent. Additionally, videos also see much higher engagement compared to other advertisement formats and drive a higher click through rate.

However, some products or other items may not have related video content available to present to a buyer (e.g., due to the effort and investment required to produce video content).

Videos may be generated from images (e.g., video frames). To generate a product video, many images of the product may be grouped together. However, when only a few images of a product are available, and the images do not provide continuity, generating a product video from such images may not be desirable. For example, multiple different images of a product from different scenes or vantage points arranged consecutively to form a video may result in a video collage, but may not be representative of a video of an image captured by moving or adjusting a camera at a scene with the product. In particular, for example, a first image of a product at a first scene followed by a second image of the product at a second scene followed by a third image of the product at a third scene is representative of a video collage rather than a video that includes multiple frames of the product shown as a camera moves, zooms, pans, etc. in the same scene continuously.

There is therefore a need for enhanced techniques for generating product videos from still frame images.

In one or more embodiments, the present disclosure provides a framework with which to generate video clips by imitating camera motions on lifestyle scenes while retaining an object (e.g., a product for sale or another item) as the primary focus, and stitching videos from different images together in the best possible sequence (e.g., in terms of composition, camera motions and cinematic best practices) to form a short video for the product or other item. These videos can be used in different video advertisements for the product or other item (e.g., either through auto-generation or self-service platforms) to increase video advertisement format adoption, and also may be used in various other platforms to drive user engagement. Video clips of objects may be generated from images by taking multiple frames of video from a single image of an object.

In one or more embodiments, the framework takes as input the lifestyle images for each product or other item, from the detail pages, their store pages, or other sources. The generation of product/item video clips based on the framework involves two stages: (1) generating camera motions, and (2) selecting and sequencing candidate videos from multiple images.

In one or more embodiments, to generate camera motions, the present disclosure may use some adapted computer vision-based object-detection methods to detect the product contour from the product lifestyle images of each unique product identifier. Next, the enhanced techniques may consider the product location, the required clip-length, video aspect ratio, and frame rates to generate a number of candidate video clips by imitating camera motions on the image scene—zooming in or out, panning, tilting etc. The enhanced techniques may follow some heuristics to produce the best types of motions for certain type of products/subjects (e.g., for clothing lifestyle images, it would be better to tilt towards the models head rather than zoom towards the middle of the product). The enhanced techniques may go beyond 2D motions—i.e., in the x-y planes of the image, and also introduce some motion-parallax and ken-burns methods by adapting computer vision techniques to imitate 3D camera motions in a real scene, improving the quality of candidate video clips. Following cinematic best practices, the enhanced techniques may ensure that the camera speed through the overall trajectory is modified to produce clips that provide a better viewer experience.

In one or more embodiments, the present disclosure may select and sequence the candidate videos in a way that produces a compelling overall short video. A sequence model may learn multiple aspects-(a) Which videos have good overall compositions: certain types of camera motions are better for certain product scenes, similar to 'shot types' in movies; (b) Which camera motions look good in sequence: so that clips placed one after the other have a good overall flow; (c) Video clips diverse or homogenous in content and camera motion (e.g., diverse in camera motion and uniform in content) and (d) Wherever possible, similar relative location and scale of the product at the end of one clip and beginning of the next. The next sequence model may be an RNN-based model that receives as inputs embeddings that represent visual and motion aspects of the clip, and predicts which video to select at each time-step of the sequence. The sequence model may be trained with data annotated by designers to select and sequence some of these clips together, and by modifying a loss function to optimize a learning function to satisfy criteria listed above. The training data may be expanded to mine existing video advertisements that include predominantly camera motion (and minimal subject motion) using foreground motion segmentation methods. Alternative to the RNN-based model, content/scene uniformity and camera shot diversity in consecutive video clips may be identified more simply. As described further below, the machine learning may learn the concepts of similarity and diversity based on video clip representations.

Some existing methods consider subject-based video cropping and shot-editing, and sequencing videos based on a storyline or following important events from multiple event cameras, like in sports. However, the enhanced framework presented herein generates clips from static images and learns optimize sequencing specific to these types of videos—by following subject types and learning cinematic best practices for predominantly camera-motion based video sequences—to produce a product video from static images. The video can then be edited with text, music, and branding elements to be consumed in various different video advertisement formats.

In one or more embodiments, generating the candidate video clips may include mimicking 2D and 3D camera motions on a still scene while maintaining focus on an object. For example, the camera shots mimicked may include panning (e.g., left to right, right to left), tilting (e.g., up to down, down to up), and zooming (e.g., zooming in, zooming out). A TRACER salient object detection network or another AI-based object detection model (e.g., phrase-grounding multi-modal AI models) may differentiate a product boundary in an image from people and other objects. After the object has been detected in an image, a model may infer the start and end crops for a camera shot (e.g., zooming, panning, tilting). Based on the start and end crops for a camera shot of an object, a sequence of images of the object between the start and end crops may be generated to create a sequence of 2D images mimicking the camera shot (e.g., motion, zoom, etc.). To convert the 2D video images to 3D video images, a system may generate a layered depth image from a 2D image and perform 3D inpainting to an image point cloud once a 3D trajectory is defined.

In one or more embodiments, contrastive learning may be used to learn video clip representations that provide cues regarding both camera shot information and visual scene content in a self-supervised manner. The cues may be used by the sequencing model to stitch together a set of temporally unordered clips. An encoder network may include a layer trained with embeddings that may be passed through a multi-dimensional projection layer for each self-supervised learning task.

In one or more embodiments, the self-supervised learning tasks may include encoding a scene similarity in the embeddings. For example, the embeddings of two video clips generated using different camera shots at the same scene may be compared for scene similarity (e.g., using a contrastive loss function). The self-supervised learning tasks may include encoding camera shot similarity in the embeddings. Considering two clips produced by a same camera shot on two different images, the embeddings may be pulled close to one another, and embeddings of two video clips with different camera shots may be pushed apart. A supervised contrastive loss function may be used to determine camera shot similarity. The encoder network for each task may be trained so that the output embeddings learn scene/content similarity and camera shot motion similarity using contrastive loss functions. The scene-similarity encoder network may be trained so that two video clips with similar scene content have similar embeddings. This may occur by pulling together embeddings of clips generated by two different camera motions on the same image (and hence similar scene), and pushing apart video clips generated from different image (and hence dissimilar scenes). Similarly, the camera motion encoder network may be trained so that two video clips generated using same/similar camera motions have similar embeddings. This may occur by pushing apart embeddings generated using different camera movements, and pulling together two video clips from different images (hence scenes), but with the same camera movement. In one or more embodiments, the encoder network may be any video representation ML model (e.g., a X3D backbone network), may receive a video clip as an input, and may generate an embedding as an output.

Figure 6:
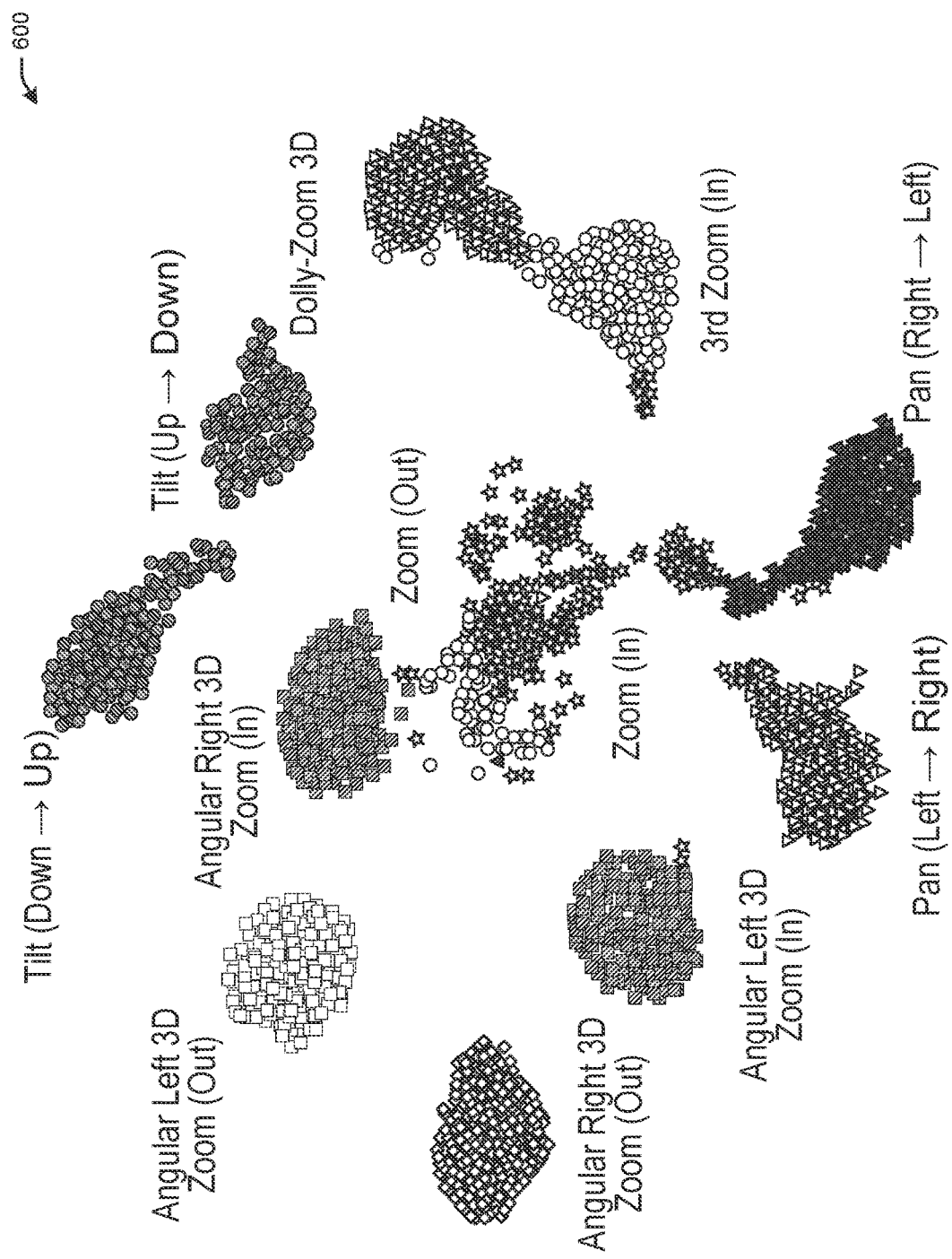
FIG. 6 is an example plot of a similarity grouping of camera shot types used to generate video clips, in accordance with one or more example embodiments of the present disclosure.

In one or more embodiments, the encoder networks may pull together video clips generated using the exact same camera movements on different scenes, and at the end of training, the network also may learn relative camera motion similarities across different camera motions (e.g., as shown in FIG. 6). Similarly, the encoder network may pull together clips generated from the same image while training. At the end of training, the network learns to have similar embeddings for video clips generated from different images with similar content. For example, when using any different camera motion to generate clips from two product images that are shot from different angles in the same scene. (Image 1, Motion 2 and Image 2, Motion 5), these two embeddings will be similar because Image 1 and 2 are similar. Regarding learning of similarities, the trained network may produce embeddings for similar clips that are closer to one another. For example, the cosine distance between embeddings from video clips produced using the same or similar camera motions is small.

In one or more embodiments, multiple images of an object at a scene and using a same camera shot (e.g., zoom in or zoom out) may be grouped together as similar and may be used to generate a video clip of the object, whereas an image of the object at a scene using one camera shot may not be selected with an image of the object at another scene or at the same scene using a different camera shot (e.g., to avoid generating a clip whose frames jump between scenes or have abrupt camera shot changes in consecutive frames). In the final sequencing, the strategy may be selected to best mimic a product videography. In particular, multiple clips may be generated per image of an object, and no more than one clip from a single image may be selected in the video sequence. Instead, the sequencing may group together clips from similar, but not the same, images on after the other for continuity while ensuring that consecutive clips are diverse in camera motion.

In one or more embodiments, the selection of images for video clips and the selection of video clips may be optimized to encourage camera motion diversity and visual homogencity of consecutive clips. In an example, for four images, A, B, C, and D, there may be twelve video clips for each image (e.g., formed by generating different 2D and 3D camera movements). The transition between the twelve videos for each image may be represented as a trellis graph in which the edges between the clip nodes indicate a camera shot similarity (e.g., obtained using a cosine similarity between embeddings of the two nodes connected by a respective edge). The best sequence may be a minimum cost path in the trellis graph to optimize for camera shot diversity and visual homogeneity. The nodes represent video clips, and the edges between two nodes in the trellis graph may represent a function of camera motion and scene similarity. The edge cost may be represented by an equation of camera_motion_similarity+scene_diversity, where scene diversity=[1−scene_similarity] learned by the network. To optimize for camera shot diversity and visual homogeneity, the path that minimizes the cost may be selected. Alternatively, the selected video clips do not need to be the lowest cost path, and instead any video clip whose cost path is below a threshold may be selected based on other criteria (e.g., known user preferences, video quality-which may be added to the cost calculation, and the like). There may be 24 orderings of the images A-D, for example, and the trellis graph steps may be repeated for each ordering of the images. The final sequence may be the overall minimum cost path or a path with a cost lower than a threshold cost. The cost path may consider both edge cost and node cost. The node cost may represent the overall composition of the video clips-clips with better overall composition (e.g., considered individually), may have lower cost.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example multi-stage learning process 100 for generating and selecting video clips from still frame images, in accordance with one or more example embodiments of the present disclosure.

Referring to FIG. 1, the multi-stage learning process 100 may include using a still frame image 102, showing an object 104 (e.g., a bowl) present in a scene 106 (e.g., a bedroom) being used to generate video clips, and a still frame image 108, showing the object 104 in a scene 110 (e.g., a kitchen) being used to generate video clips. For example, the still frame image 102 may be used to generate video frames of a video clip 120 and video frames of a video clip 130 (not limited to two video clips). The still frame image 108 may be used to generate video frames of a video clip 140 and video frames of a video clip 150 (not limited to two video clips). The video clips generated using the still frames images may be input to machine learning (ML) models 160 (e.g., self-supervised learning models-one model for scene similarity, and one model for camera shot similarity), which may generate embeddings 162 indicating scene features of the video clips 120, 130, 140, and 150, and camera shot features of the video clips 120, 130, 140, and 150. The embeddings 162 may be input to a sequence model or trellis graph 170, which may generate a video sequence 180 for the object 104 by combining some of the video clips generated from the still frame images.

In one or more embodiments, the multi-stage learning process 100 takes as inputs the still frame images for each product (e.g., the still frame image 102 of the object 104 as a product for sale, the still frame image 108 of the object 104 as a product for sale), either from the detail pages or their store pages. This multi-stage learning process 100 may include two stages: (1) generating camera motions, and (2) selecting and sequencing candidate videos from multiple images.

In one or more embodiments, to generate camera motions, the multi-stage learning process 100 may use some adapted computer vision-based object-detection methods to detect the object 104 contour from the still frame images. Next, the multi-stage learning process 100 may consider the product location (e.g., the scene 106, the scene 110), the required clip-length, video aspect ratio, and frame rates to generate a number of candidate video clips by imitating camera motions on the image scene-zooming in or out, panning, tilting etc. For example, the video clip 120 may be generated by simulating a camera shot type applied to the still frame image 102, and the video clip 130 may be generated by simulating a different camera shot type applied to the still frame image 102. Similarly, the video clip 140 may be generated by simulating a camera shot type applied to the still frame image 108, and the video clip 150 may be generated by simulating a different camera shot type applied to the still frame image 108. In this manner, the video frames of each respective video clip may be generated using a particular camera shot type (e.g., the video clip 120 may be generated using video frames simulating a zoom-in camera shot, the video clip 130 may be generated using video frames simulating a zoom-out camera shot, etc.).

In one or more embodiments, the sequence model or trellis graph 170 may select and sequence the candidate videos for the video sequence 180. The sequence model or trellis graph 170, when implemented as a sequence model rather than the trellis graph, may learn multiple aspects-(a) Which videos have good overall compositions: certain types of camera motions are better for certain product scenes, similar to 'shot types' in movies; (b) Which camera shot types look good in the video sequence 180: so that clips placed one after the other have a good overall flow; (c) Video clips diverse in content and camera motion and (d) Wherever possible, similar relative location and scale of the product at the end of one clip and beginning of the next. The decisions may be based on the embeddings 162. The sequence model or trellis graph 170, when implemented as a sequence model, may be an RNN-based model that receives as inputs the embeddings 162 that represent visual and motion aspects of the video clips, and predicts which video clips to select at each time-step of the video sequence 180 (e.g., the video clips and the order of the video clips to create the sequence). The sequence model or trellis graph 170, when implemented as a sequence model, may be trained with data annotated by designers to select and sequence some of these clips together, and by modifying a loss function to optimize a learning function to satisfy criteria listed above. The training data may be expanded to mine existing video advertisements that include predominantly camera motion (and minimal subject motion) using foreground motion segmentation methods.

Figure 2:
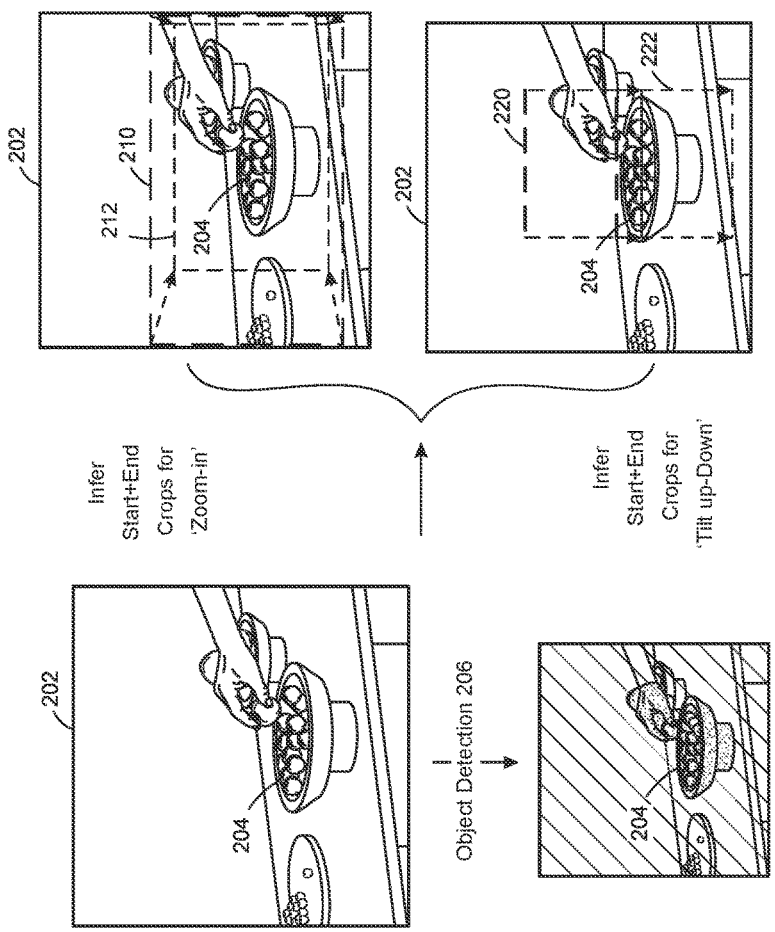
FIG. 2 illustrates example video frames generated from still frame images and used to generate a video clip, in accordance with one or more example embodiments of the present disclosure.
Figure 13:
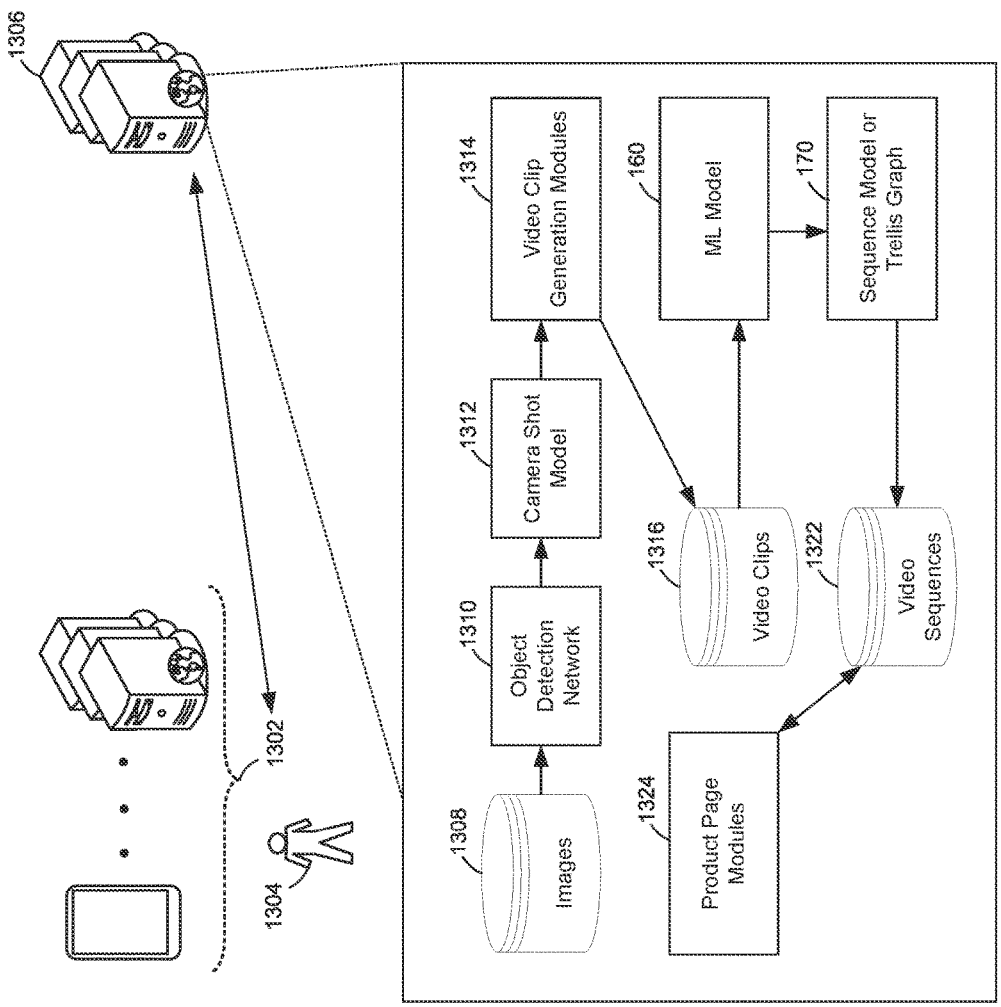
FIG. 13 illustrates an example system for generating and selecting video clips from still frame images, in accordance with one or more example embodiments of the present disclosure.

In one or more embodiments, generating the candidate video clips from the still frame images may include mimicking 2D and 3D camera motions on a still scene while maintaining focus on the object 104. For example, the camera shots mimicked may include panning (e.g., left to right, right to left), tilting (e.g., up to down, down to up), and zooming (e.g., zooming in, zooming out). A TRACER salient object detection network (e.g., as shown in FIG. 2) may differentiate a product boundary in an image from people and other objects. After the object 104 has been detected in an image, a model (e.g., as shown in FIG. 13) may infer the start and end crops for a camera shot (e.g., zooming, panning, tilting). Based on the start and end crops for a camera shot of the object 104, a sequence of images of the object 104 between the start and end crops may be generated (e.g., as shown in FIG. 2) to create a sequence of 2D images (e.g., the video frames of the video clips 120, 130, 140, 150, etc.) mimicking the respective camera shot (e.g., motion, zoom, etc.). To convert the 2D video images to 3D video images, a system may generate a layered depth image from a 2D image and perform 3D inpainting to an image point cloud once a 3D trajectory is defined.

In one or more embodiments, contrastive learning may be used to learn video clip representations that provide cues regarding both camera shot information and visual scene content in a self-supervised manner. The cues may be used by the sequence model or trellis graph 170, when implemented as a sequence model, to stitch together a set of temporally unordered video clips. Encoder networks (e.g., an encoder network for scene similarity and an encoder network of camera shot similarity) of the ML models 160 may include a layer trained with embeddings that may be passed through a multi-dimensional projection layer for each self-supervised learning task. The self-supervised learning tasks may include encoding a scene similarity in the embeddings. For example, the embeddings of two video clips generated using different camera shots at the same scene may be compared for scene similarity (e.g., using a contrastive loss function). The self-supervised learning tasks may include encoding camera shot similarity in the embeddings. Considering two clips produced by a same camera shot on two different images, the embeddings may be pulled close to one another, and embeddings of two video clips with different camera shots may be pushed apart. A supervised contrastive loss function may be used to determine camera shot similarity. For example, multiple images of an object at a scene and using a same camera shot (e.g., zoom in or zoom out) may be grouped together as similar and may be used to generate a video clip of the object, whereas an image of the object at a scene using one camera shot may not be selected with an image of the object at another scene or at the same scene using a different camera shot (e.g., to avoid generating a clip whose frames jump between scenes or have abrupt camera shot changes in consecutive frames).

In one or more embodiments, the selection of images for video clips and the selection of video clips may be optimized to encourage camera motion diversity and visual homogencity of consecutive clips. In an example, for four images, A, B, C, and D, there may be twelve video clips for each image (e.g., formed by generating different 2D and 3D camera movements). The transition between the twelve videos for each image may be represented as a trellis graph in which the edges between the clip nodes indicate a camera shot similarity (e.g., obtained using a cosine similarity between embeddings of the two nodes connected by a respective edge). The best sequence may be a minimum cost path in the trellis graph to optimize for camera shot diversity and visual homogeneity. The nodes represent video clips, and the edges between two nodes in the trellis graph may represent a function of camera motion and scene similarity. The edge cost may be represented by an equation of camera_motion_similarity+scene_diversity, where scene diversity=[1−scene_similarity] learned by the network. To optimize for camera shot diversity and visual homogeneity, the path that minimizes the cost may be selected. Alternatively, the selected video clips do not need to be the lowest cost path, and instead any video clip whose cost path is below a threshold may be selected based on other criteria (e.g., known user preferences, video quality-which may be added to the cost calculation, and the like). There may be 24 orderings of the images A-D, for example, and the trellis graph steps may be repeated for each ordering of the images. The final sequence may be the overall minimum cost path or a path with a cost lower than a threshold cost. The cost path may consider both edge cost and node cost. The node cost may represent the overall composition of the video clips-clips with better overall composition (e.g., considered individually), may have lower cost.

In one or more embodiments, the video sequence 180 should include video clips that have minimal overlap of content across different clips. An online marketplace's product detail page often contains lifestyle images in very similar locations. For example, some clothing available for purchase would contain multiple images of a clothing model in different poses in the same location. The sequence model or trellis graph 170 may prefer video clips from similar images grouped together, but not clips from the same images that would form jump cuts. However, the sequence model or trellis graph 170 may apply this restriction at the video-clip level rather than at the image level. This is because sometimes there may be dissimilar video clips from images in the same or similar locations—for example, one clip could focus on the details of shirt sleeves, and the other could focus on shirt collar details. The sequence model or trellis graph 170 may select these as two diverse clips, potentially generated from the same still frame image. Avoiding consecutive clips that contain very similar information also discourages jump cuts, which is an important cinematic best practice. Additionally, it is important to learn an ideal order for camera movement between consecutive clips. The sequence model or trellis graph 170 may ensure that the video sequence 180 does not include consecutive video clips using the same camera shot type. For example, using two zooms continuously for different video clips may make the overall video sequence 180 less appealing. Additionally, the sequence model or trellis graph 170 may learn an ideal order/best-practices of camera motions based on a number of past videos.

In one or more embodiments, while two images are shown to generate the video sequence, more images may be used in the same manner to candidate generate video clips for a sequence.

FIG. 2 illustrates example video frames generated from still frame images and used to generate a video clip, in accordance with one or more example embodiments of the present disclosure.

Referring to FIG. 2, a still frame image 202 may show an object 204 (e.g., a serving plate). An object detection model (e.g., as shown in FIG. 13) may be used for object detection 206 to identify objects represented by the still frame image 202 (e.g., the object 204). In addition, a camera shot model (e.g., as shown in FIG. 13) may infer the start and end crops for a camera shot. For example, for a zoom-in camera shot applied to the still frame image 202, the camera shot model may infer a start crop 210 and an end crop 212, simulating a camera zooming in on the object 204 in the still frame image 202. The start crop 210, the end crop 212, and intermediate crops between the start crop 210 and the end crop 212 may result in respective images to use as video frames in a video clip showing a zoom-in on the object 204. Similarly, for a tilt from up-to-down camera shot, a start crop 220 may be higher in the still frame image 202 than an end crop 222 in the still frame image 202 so that video frames generated by the start crop 220, the end crop 222, and intermediate crops between the start crop 220 and the end crop 222 may simulate a camera tilting from up to down to generate a video clip of the object 204.

Figure 3A:
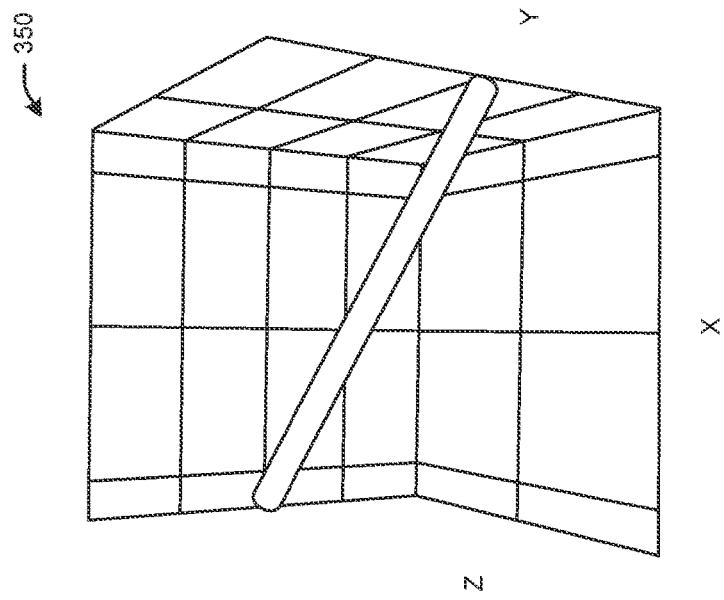
FIG. 3A illustrates an example camera trajectory for a three-dimensional camera shot used to generate video frames from still frame images by mimicking three dimensional camera movement, in accordance with one or more example embodiments of the present disclosure.

FIG. 3A illustrates an example camera trajectory 300 for a three-dimensional camera shot used to generate video frames from still frame images by mimicking three dimensional camera movement, in accordance with one or more example embodiments of the present disclosure.

Figure 3B:
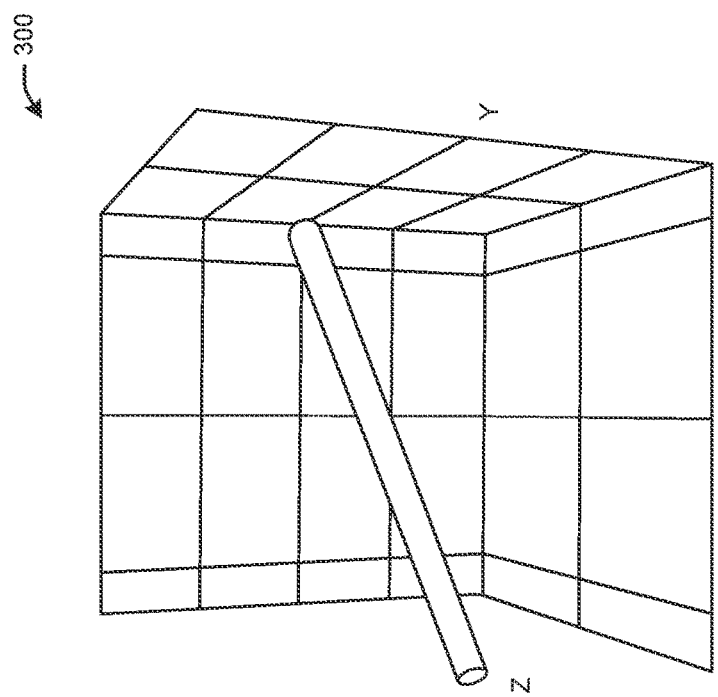
FIG. 3B illustrates an example camera trajectory for a three-dimensional camera shot used to generate video frames from still frame images by mimicking three dimensional camera movement, in accordance with one or more example embodiments of the present disclosure.

FIG. 3B illustrates an example camera trajectory 350 for a three-dimensional camera shot used to generate video frames from still frame images by mimicking three dimensional camera movement, in accordance with one or more example embodiments of the present disclosure.

Referring to FIGS. 3A and 3B, the camera trajectory 300 may be different than the camera trajectory 350 based on the axial movement of a camera that may be simulated to generate video frames from still frame images (e.g., as shown in FIGS. 1 and 2). The video clip generation may allow for multiple layers of an image to move at different speeds (e.g., a foreground object against a background) to simulate 3D motions.

Figure 4:
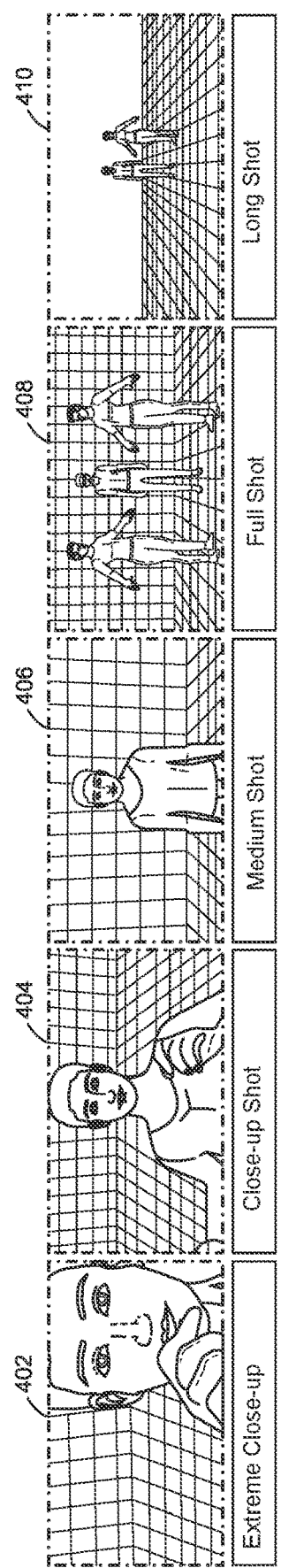
FIG. 4 illustrates example camera shot types, in accordance with one or more example embodiments of the present disclosure.

FIG. 4 illustrates example camera shot types, in accordance with one or more example embodiments of the present disclosure.

Referring to FIG. 4, image 402, image 404, image 406, image 408, and image 410 may represent still frame images captured by a camera. Image 402 may represent an extreme close-up shot. Image 404 may represent a close-up shot. Image 406 may represent a medium shot. Image 408 may represent a full shot, and image 410 may represent a long shot.

In one or more embodiments, when there are a number of different viable video clips generated from a same image (e.g., as shown in FIG. 1), there are some clips that have better video composition through the generated camera motion. Inherently, this is also related to the shot-type in cinematography. If the image is a long shot like the long shot image 410, zooming into the image, or zooming out of the salient-object would produce a better video clip than panning or tilting. While selecting the clips from the pool of video clips, the sequence model or trellis graph 170 of FIG. 1 may enforce a selection of clips with better overall composition. Additionally, there could be other best practices that help select the clips to generate the video sequence 180 of FIG. 1.

Figure 5A:
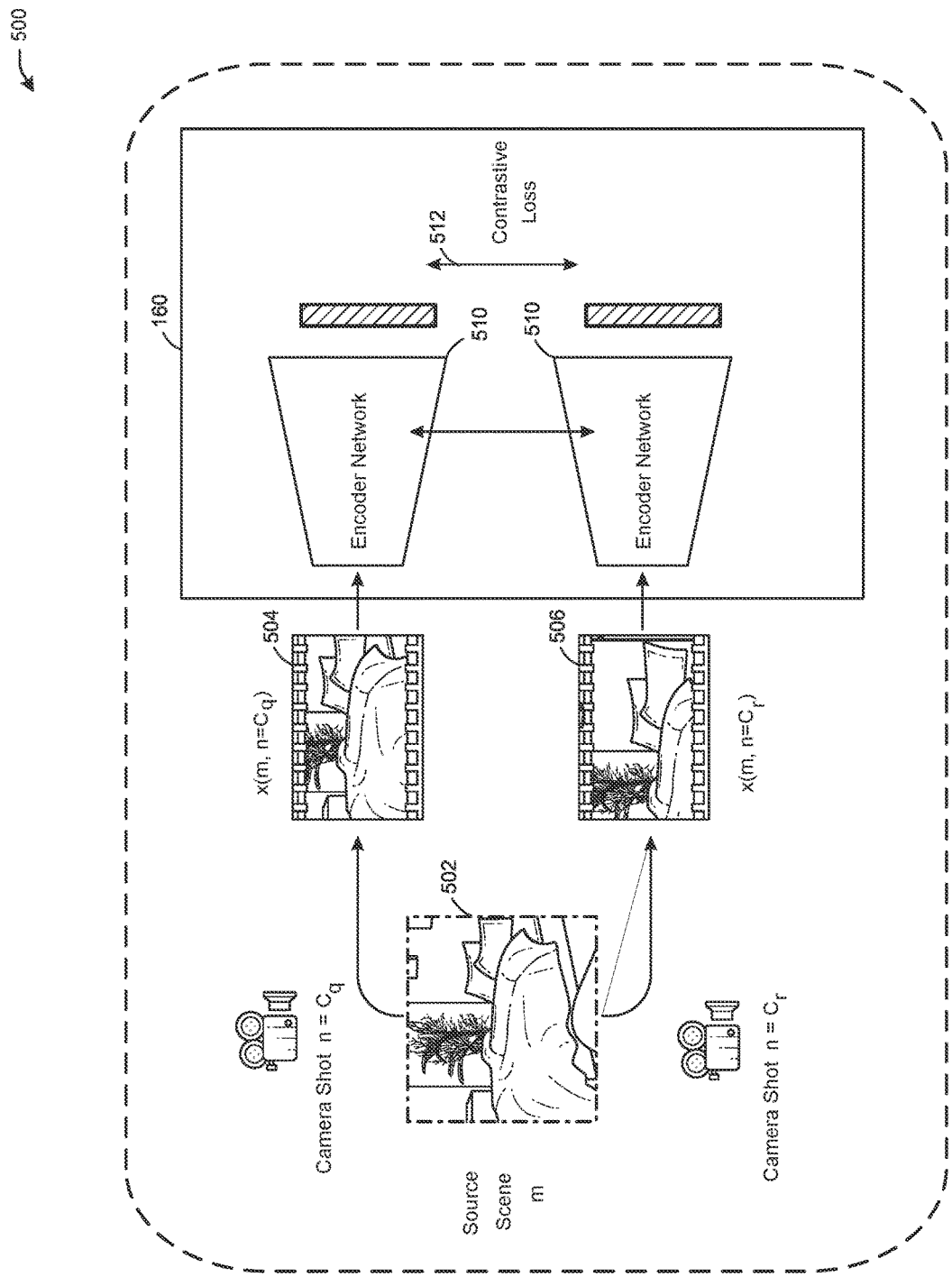
FIG. 5A illustrates an example learning process for generating video clips from still frame images and evaluating scene similarity of the video clips, in accordance with one or more example embodiments of the present disclosure.

FIG. 5A illustrates an example learning process 500 for generating video clips from still frame images and evaluating scene similarity of the video clips, in accordance with one or more example embodiments of the present disclosure.

Referring to FIG. 5A, the learning process 500 may include a still frame image 502 of a source scene m (e.g., a bedroom). Application of camera shot types to the still frame image 502 may generate video frames for video clips. For example, a camera shot $n=C_q$ applied to the still frame image 502 may result in a video clip 504 of video frames $x(m, n=C_q)$, and a camera shot $n=C_r$ applied to the still frame image 502 may result in a video clip 506 of video frames $x(m, n=C_r)$. The video clip 504 and the video clip 506 may be input to the ML models 160 of FIG. 1.

Still referring to FIG. 5A, the ML models 160 may include encoder networks 510 (e.g., an X3D-medium encoder network with a final 1×1 layer of 1024 units–during training, the embeddings from the 1×1 layer may be passed through a 128 dimensional projection layer for each self-supervised learning task). The ML models 160 may encode scene similarity into embeddings (e.g., the embeddings 162 of FIG. 1), which may be vector representations of discrete variables indicative of scene characteristics of the video frames. The encoder networks 510 may be trained so that the output embeddings learn scene/content similarity and camera shot similarity (e.g., FIG. 5B). The scene similarity portion of the encoder networks 510 may be trained so that two video clips with similar scene content have similar embeddings. The embeddings of two video clips generated using different camera shots of a same scene may include the embeddings of the video clip 504 and of the video clip 506 of scene m. Using a contrastive loss function 512 (e.g., a SimCLR contrastive loss function) for scene similarity, the embeddings with similar scene embeddings may be pulled together.

Figure 5B:
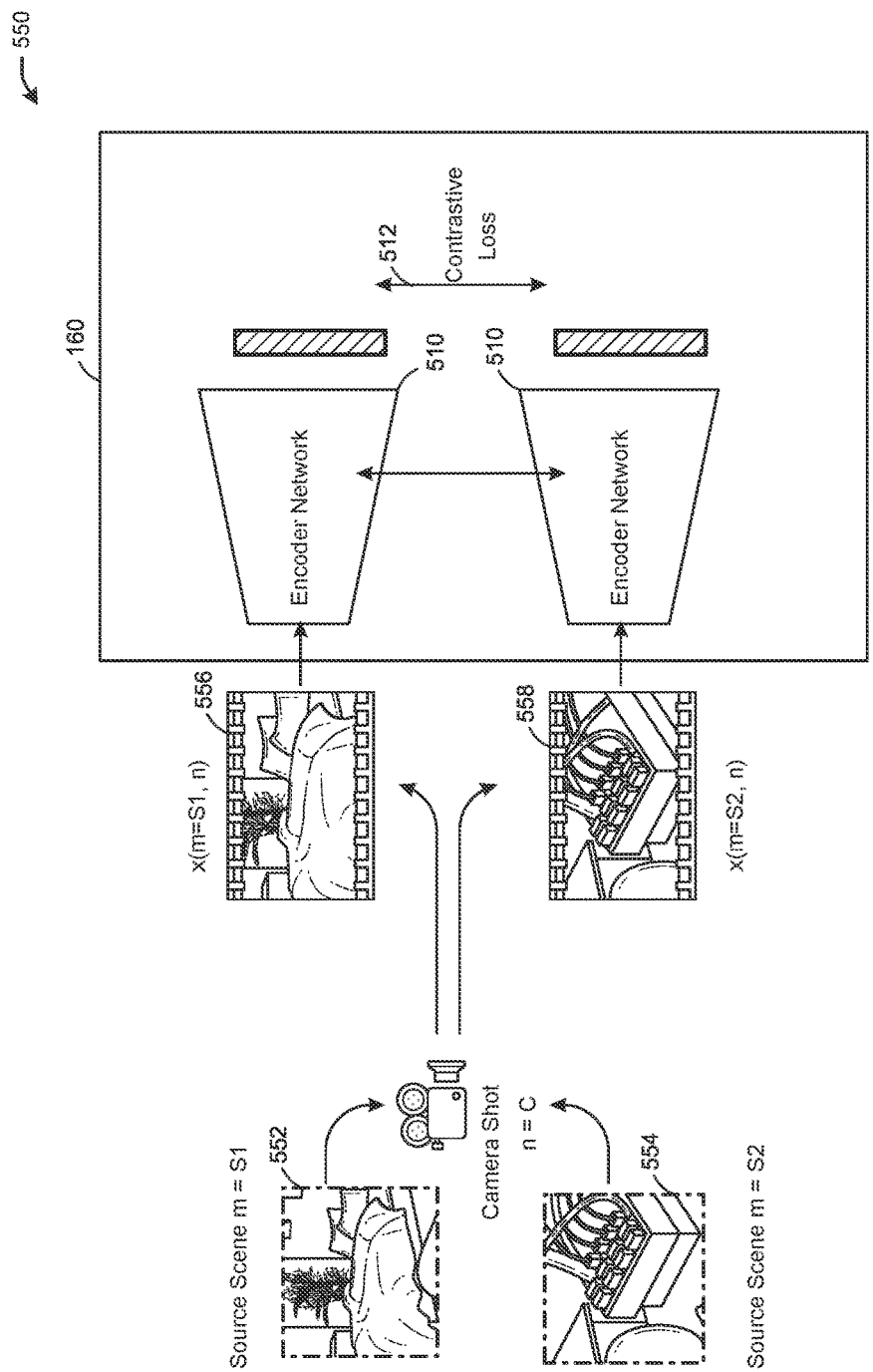
FIG. 5B illustrates an example learning process for generating video clips from still frame images and evaluating camera shot similarity of the video clips, in accordance with one or more example embodiments of the present disclosure.

FIG. 5B illustrates an example learning process 550 for generating video clips from still frame images and evaluating camera shot similarity of the video clips, in accordance with one or more example embodiments of the present disclosure.

Referring to FIG. 5B, the learning process 550 may include a still frame image 552 at a source scene m=$S_1$, and a still frame image 554 of a source scene=$S_2$. Applying a camera shot n=C to the still frame image 552 may result in a video clip 556 of video frames (m=$S_1$, n), and applying the camera shot n=C to the still frame image 554 may result in a video clip 558 of video frames (m=$S_2$, n). The video clip 556 and the video clip 558 may be input to the ML models 160 of FIG. 1.

Still referring to FIG. 5B, the encoder networks 510 of FIG. 5A may encode camera shot similarity into embeddings (e.g., the embeddings 162 of FIG. 1), which may be vector representations of discrete variables indicative of camera shot characteristics of the video frames. The camera shot similarity portion of the encoder networks 510 may be trained so that clips with similar camera shots may be grouped together, and may include the embeddings of the video clip 556 and of the video clip 558. Using the contrastive loss function 512 (e.g., a SimCLR contrastive loss function) for camera shot similarity, the camera shot similarity between any two video clips may be determined.

Referring to FIGS. 5A and 5B, by generating the embeddings for both scene features and camera shot features of respective video clips, the ML models 160 may facilitate the capability of the sequence model or trellis graph 170 to select video clips for inclusion in the video sequence 180 by optimizing both scene homogeneity/similarity and camera shot diversity by comparing the scene and camera shot embeddings of video clips as described herein.

FIG. 6 is an example plot 600 of a similarity grouping of camera shot types used to generate video clips, in accordance with one or more example embodiments of the present disclosure. More particularly, FIG. 6 shows a sample visualization of embeddings generated by a trained camera motion encoder (e.g., of the encoder networks 510 of FIGS. 5A and 5B) for a dataset of video clips generated using different camera motions.

Referring to FIG. 6, the plot 600 shows data points corresponding to video clips generated by applying the shown camera shots to still frame images. The groupings of the video clips show information learned by the camera shot encoder of the encoder networks 510 of FIGS. 5A and 5B, specifically the relative distances between videos of different camera shot types, to be considered by the sequence model or trellis graph 170 of FIG. 1 when selecting video clips for inclusion in the video sequence 180 of FIG. 1 in a manner that optimizes scene and camera shot diversity. The data points may represent the camera shot embeddings generated by the ML models 160 of FIG. 1 (e.g., as shown in FIG. 5A). For example, a zoom-in camera shot and a zoom-out camera shot are similar in terms of camera shot similarities, so they may be grouped closer together than a tilt camera shot and a pan camera shot. In this manner, when the sequence model or trellis graph 170 selects video clips for the video sequence 180, the sequence model or trellis graph 170 may avoid selecting clips, at least consecutively in the video sequence 180, that use camera shots similar to the consecutive or other video clips in the sequence (e.g., avoid selecting a video clip using a zoom-in and another video clip using a zoom-out).

Figure 7:
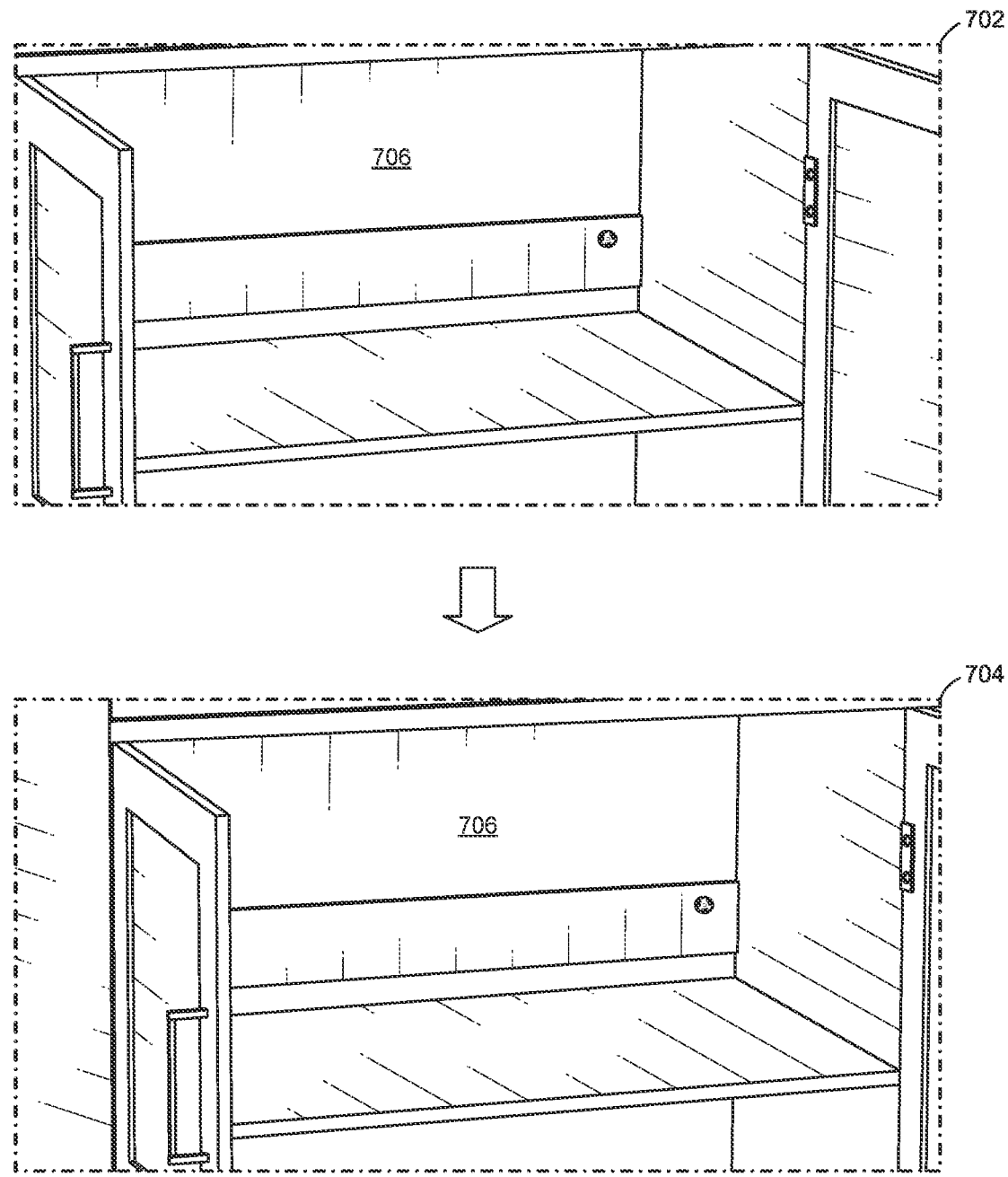
FIG. 7 illustrates example video frames generated for a video clip using a camera shot type, in accordance with one or more example embodiments of the present disclosure.

FIG. 7 illustrates example video frames generated for a video clip using a camera shot type, in accordance with one or more example embodiments of the present disclosure.

For example, video frame 702 and video frame 704 may represent images of an object 706 (e.g., a shelf/cabinet) that use a camera pan shot (e.g., a pan from right to left).

Figure 8:
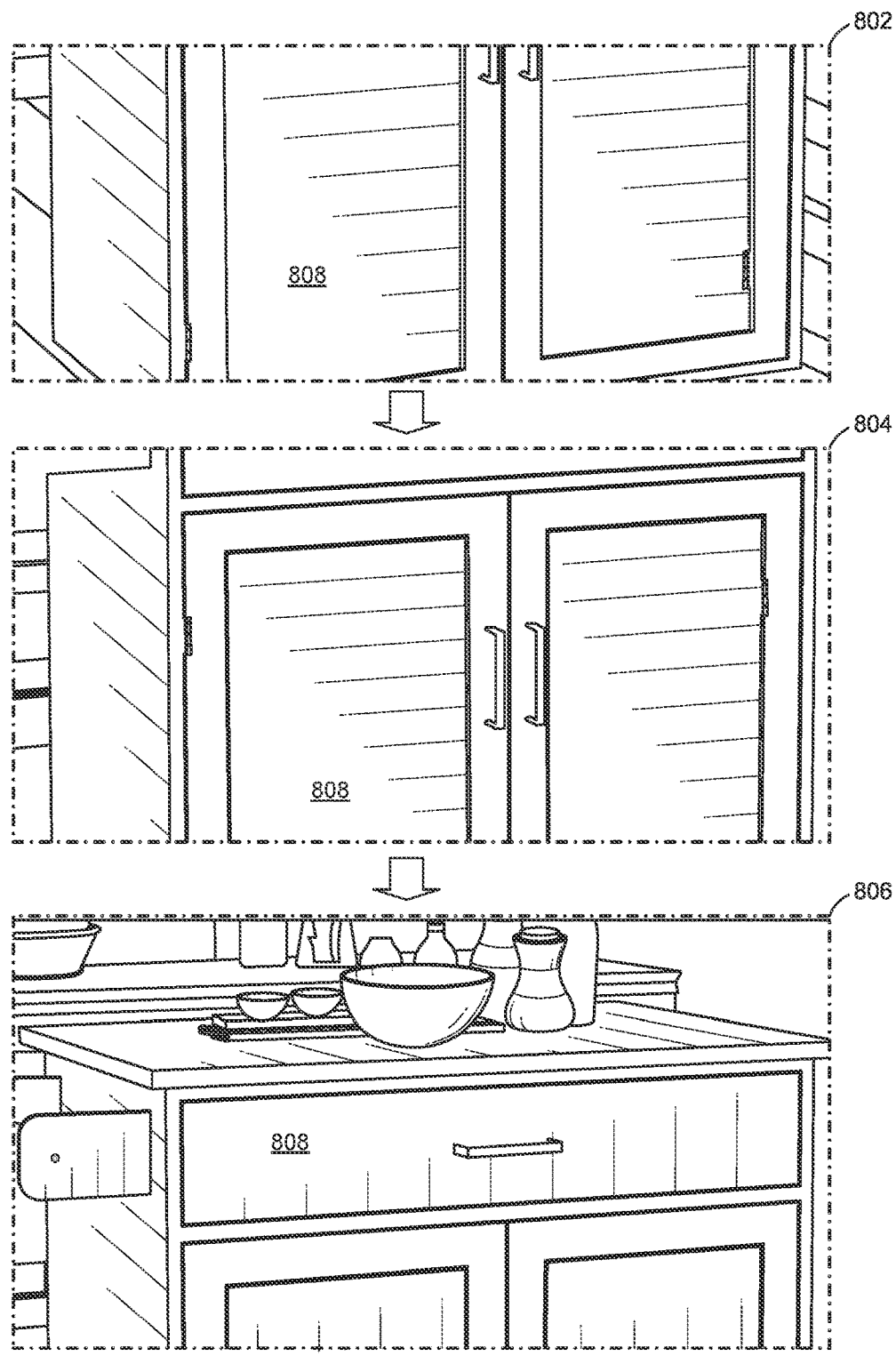
FIG. 8 illustrates example video frames generated for a video clip using a camera shot type, in accordance with one or more example embodiments of the present disclosure.

FIG. 8 illustrates example video frames generated for a video clip using a camera shot type, in accordance with one or more example embodiments of the present disclosure.

For example, video frame 802, video frame 804, and video frame 806 may represent images of an object 808 (e.g., a kitchen island) that use a camera tilt shot (e.g., a tilt from down to up).

Figure 9:
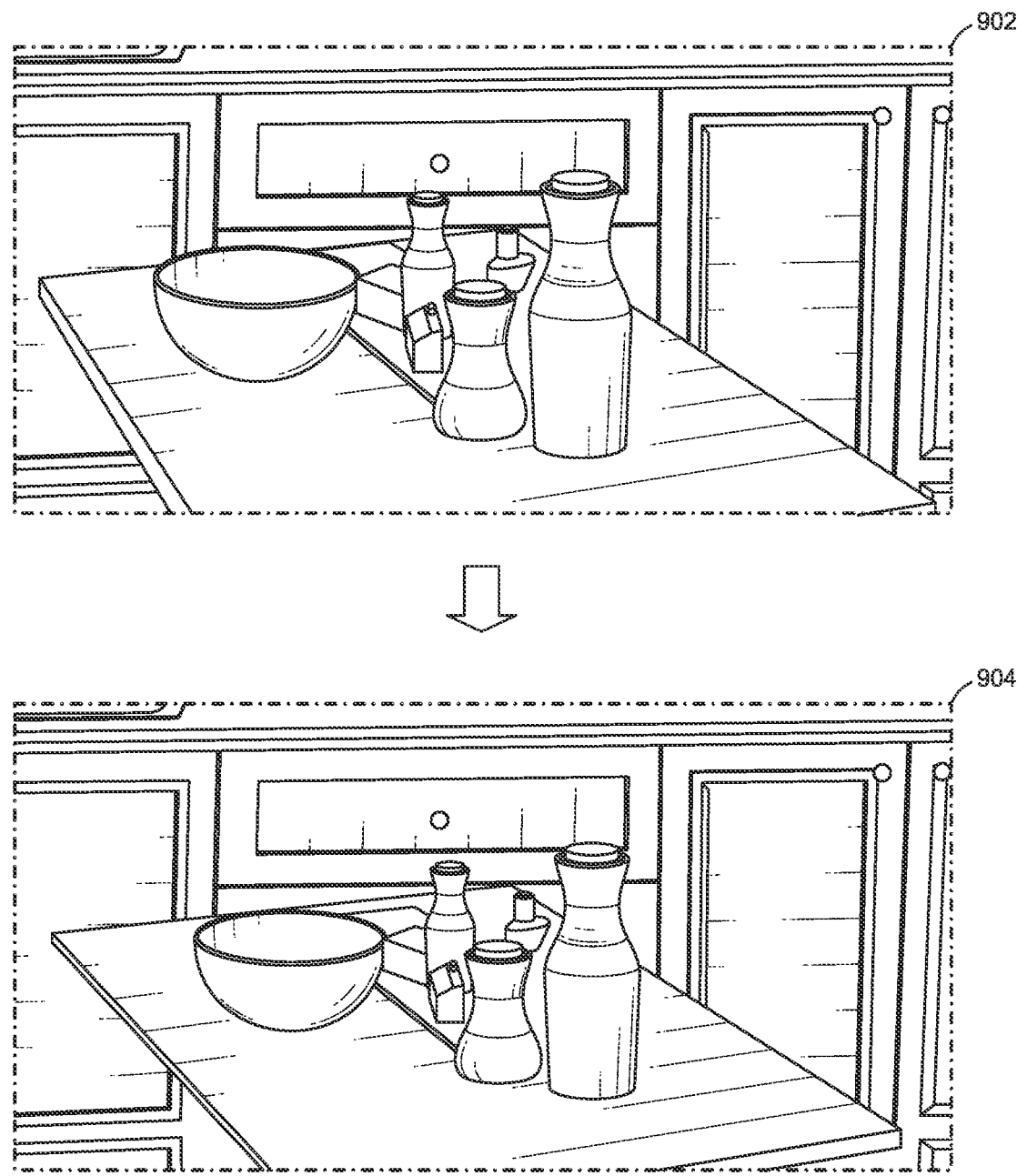
FIG. 9 illustrates example video frames generated for a video clip using a camera shot type, in accordance with one or more example embodiments of the present disclosure.

FIG. 9 illustrates example video frames generated for a video clip using a camera shot type, in accordance with one or more example embodiments of the present disclosure.

For example, video frame 902 and video frame 904 may represent images of objects (e.g., kitchen utensils, a shelf) that use a camera angular zoom shot (e.g., an angular zoom out).

Figure 10:
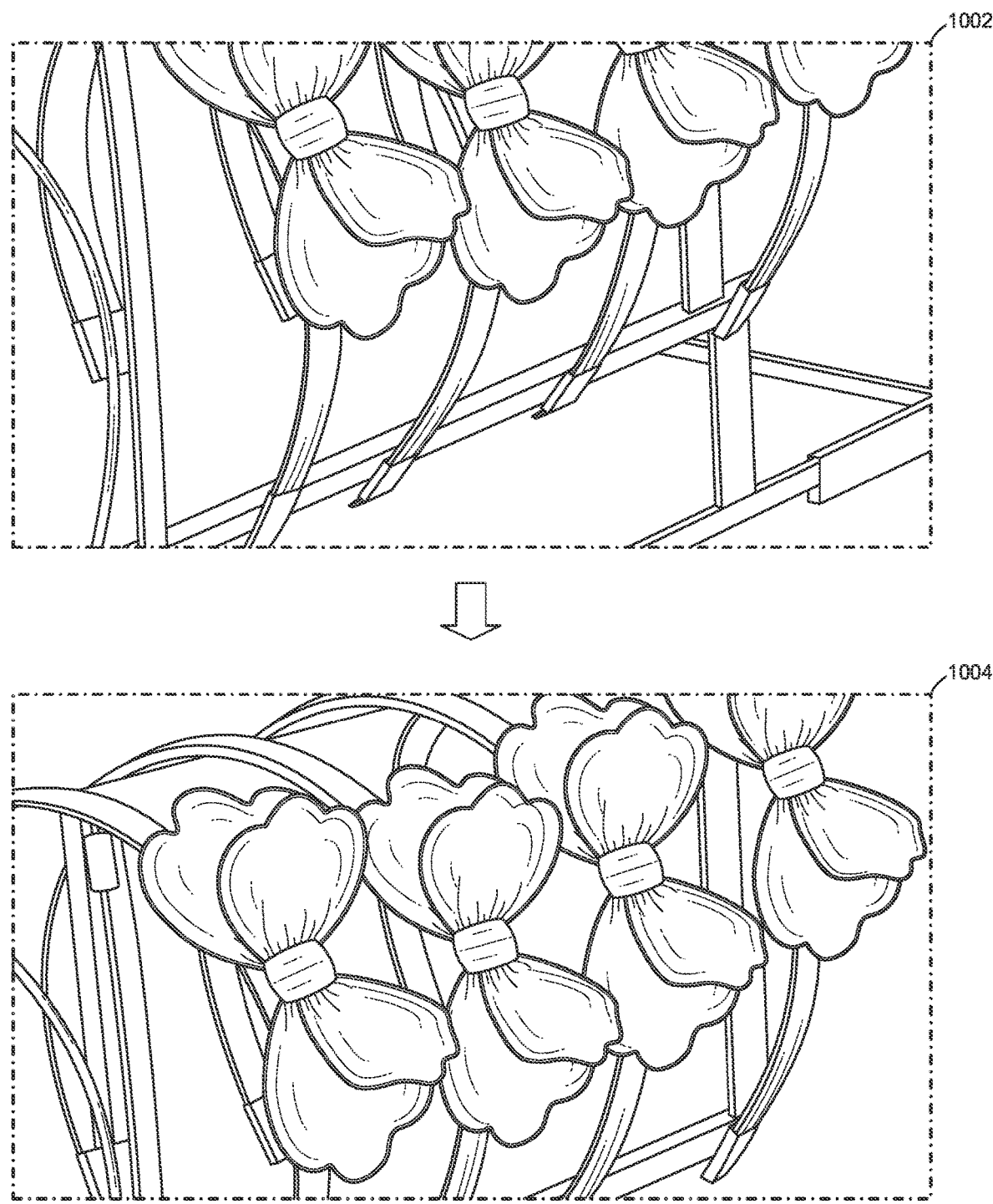
FIG. 10 illustrates example video frames generated for a video clip using a camera shot type, in accordance with one or more example embodiments of the present disclosure.

FIG. 10 illustrates example video frames generated for a video clip using a camera shot type, in accordance with one or more example embodiments of the present disclosure.

For example, video frame 1002 and video frame 1004 may represent images of objects (e.g., hair bands) that use a camera angular zoom shot (e.g., an angular zoom in).

Figure 11:
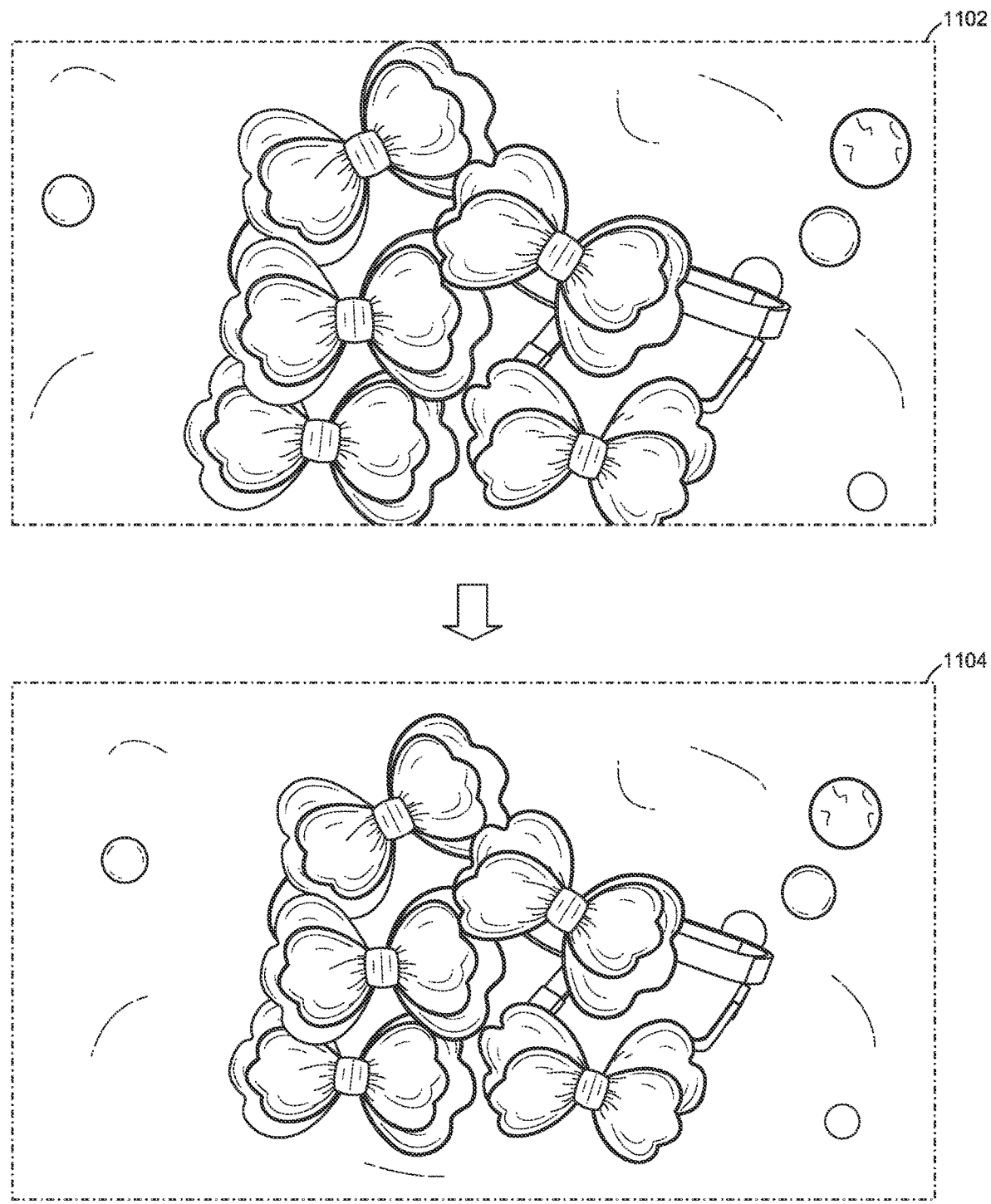
FIG. 11 illustrates example video frames generated for a video clip using a camera shot type, in accordance with one or more example embodiments of the present disclosure.

FIG. 11 illustrates example video frames generated for a video clip using a camera shot type, in accordance with one or more example embodiments of the present disclosure.

For example, video frame 1102 and video frame 1104 may represent images of objects (e.g., hair bows) that use a camera angular zoom shot (e.g., an angular zoom out).

Figure 12:
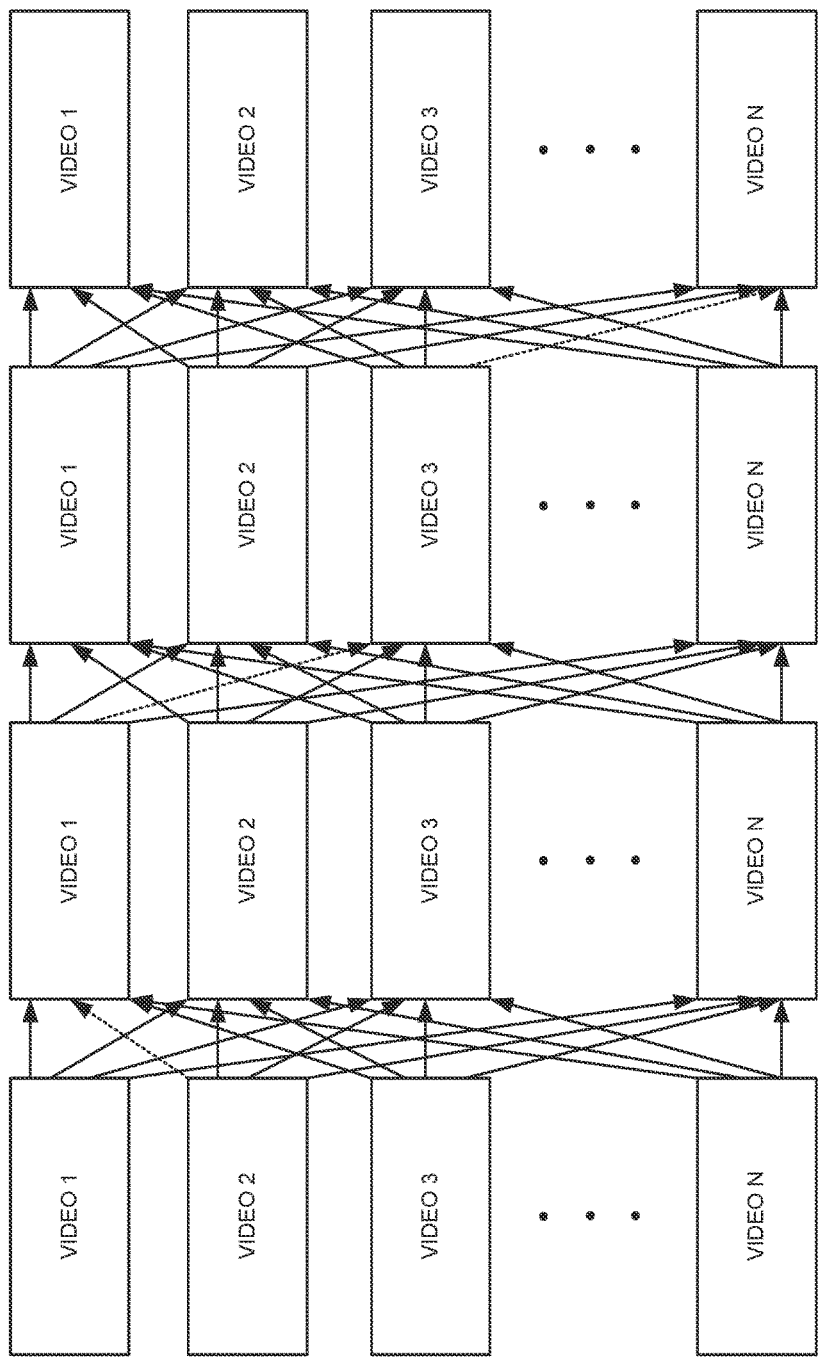
FIG. 12 illustrates an example trellis graph generated by embeddings of video clips generated from still frame images, in accordance with one or more example embodiments of the present disclosure.

FIG. 12 illustrates an example trellis graph 1200 generated by embeddings of video clips generated from still frame images, in accordance with one or more example embodiments of the present disclosure.

Referring to FIG. 12, nodes of the trellis graph 1200 may be represented by video clips generated from still frame images (e.g., video 1, video 2, video 3, . . . , video N generated from image A, image B, image C, and image D, respectively), such as shown in FIGS. 1, 5A, and 5B. The edges (e.g., represented by the arrows in between each respective video as a node) may represent a weight indicative of the scene and camera shot similarities between any two respective nodes connected by a respective edge. The weight of each edge may be determined by the equation: $W_i$=(camera shot similarity)+(1−scene similarity), in which $W_i$ represents an i-th edge weight, the camera shot similarity represents a cosine similarity of the camera shot embeddings of the two video clips connected by $W_i$ (e.g., determined as described with respect to FIG. 5B), and scene similarity represents a cosine similarity of the camera shot embeddings of the two video clips connected by $W_i$ (e.g., determined as described with respect to FIG. 5A). The edge weight equation above, therefore, may maximize camera shot diversity and minimize scene diversity. The weight of each edge also may account for video composition (e.g., a higher composition may reduce the path weight when it is more desirable to select a video with better quality). In this manner, the sequence model or trellis graph 170 of FIG. 1 may select video clips for the video sequence 180 of FIG. 1 to ensure camera shot and scene diversity by identifying a low-cost path from the left side of the trellis graph 1200 to the right side of the trellis graph 1200 (e.g., represented by the dotted arrows shown from Video 2, Image A to Video 1, Image B, to Video 3, Image C, to Video N, Image D).

FIG. 13 illustrates an example system 1300 for generating and selecting video clips from still frame images, in accordance with one or more example embodiments of the present disclosure. For example, the system 1300 may facilitate the multi-stage learning process 100 of FIG. 1.

Referring to FIG. 13, the system 1300 may include devices 1302, accessible by users 1304. The devices 1302 may access a remote system 1306 (e.g., to access product pages of an online marketplace with which to purchase products). The remote system 1306 may include image storage 1308 for still frame images of products sold by the online marketplace. An object detection network 1310 may detect objects in the images corresponding to products for sale using the online marketplace. A camera shot model 1312 may infer the start and end crops for a camera shot (e.g., as shown in FIG. 2). Video clip generation modules 1314 may generate, by applying camera shots to the images, video clips based on the start and end crops for camera shots focused on the objects detected in the images. The candidate video clips for a product video sequence (e.g., the video sequence 180 of FIG. 1) may be stored in a video clip storage 1316 and input to the ML models 160 of FIG. 1, which may generate the embeddings for scene features and camera shot features. The sequence model or trellis graph 170 of FIG. 1 may select the video clips to use in a video sequence for a product (e.g., implemented as the trellis graph 1200 of FIG. 12 or implemented as a sequence model) based on the embeddings and the video clips generated from the still frame images. The generated video sequences may be stored in a video sequence storage 1322 and made available to product page modules 1324, which may generate the presentation data for product pages to be viewed by the users 1304 via the devices 1302. The product pages may include the still frame images of the products, the generated video sequences of the products, product details (e.g., prices, specifications, etc.), product fulfillment options (e.g., delivery and/or pick-up dates and times), product reviews, and the like.

Figure 14:
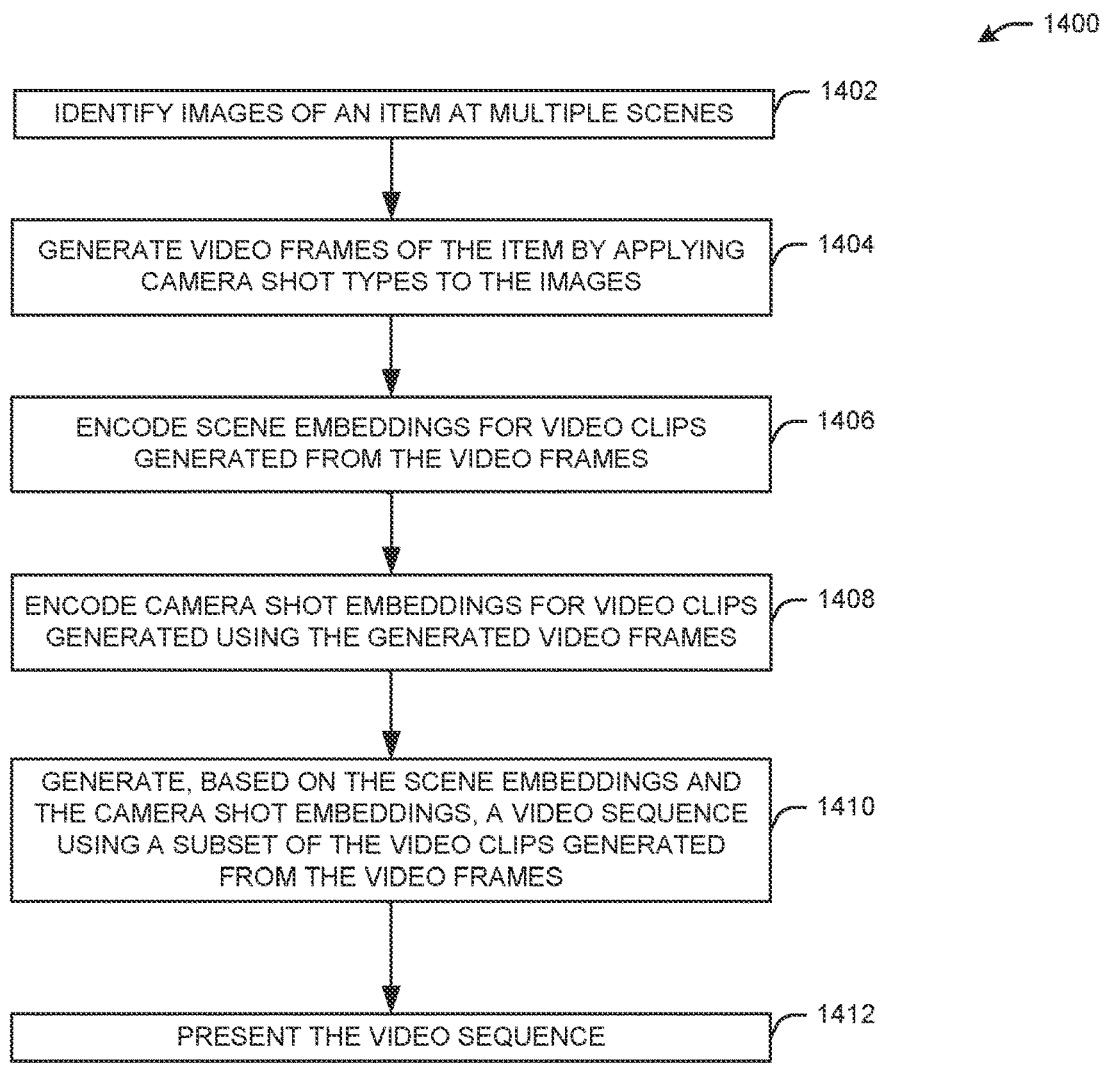
FIG. 14 illustrates a flow diagram for a process for generating and selecting video clips from still frame images, in accordance with one or more example embodiments of the present disclosure.

FIG. 14 illustrates a flow diagram for a process 1400 for generating and selecting video clips from still frame images, in accordance with one or more example embodiments of the present disclosure.

At block 1402, a device (or system, e.g., the remote system 1306 of FIG. 13) may identify still frame images (e.g., the still frame images 102 and 108 of FIG. 1, the still frame image 202 of FIG. 2, the still frame image 502 of FIG. 5A, the still frame images 552 and 554 of FIG. 5B, images A-D of FIG. 12) of an item (e.g., a product for sale using an online marketplace or another item). Some of the still frame images may show the item (e.g., an object) in a same scene, and some of the images may show the item in different scenes.

At block 1404, the device may generate video frames showing the item by applying camera shot types to the still frame images. A respective video clip may be generated by applying a single camera shot type to a still frame image to generate multiple video frames simulating the camera shot type. In this manner, the video clips may show the item at different scenes respectively, using different camera shot types, and may show the item at a same scene using different camera shot types. The video clips also may focus on different portions of the item, such as a camera shot type focusing on a shirt's collar and a camera shot type focusing on a shirt's sleeves.

At block 1406, the device may use a first machine learning model of the machine learning models 160 of FIG. 1 to encode scene embeddings for the video clips. This process is shown and described in further detail with respect to FIG. 5B. The embeddings may be vector representations whose respective values may indicate characteristics of a scene shown by a respective video clip.

At block 1408, the device may use a second machine learning model of the machine learning models 160 of FIG. 1 to encode camera shot embeddings for the video clips. This process is shown and described in further detail with respect to FIG. 5A. The embeddings may be vector representations whose respective values may indicate characteristics of a camera shot used by a respective video clip.

At block 1410, the device may generate a video sequence by selecting a subset of the video clips for a product representation. The selection (e.g., performed by the sequence model or trellis graph 170 of FIG. 1) may identify a low-cost path (e.g., across the trellis graph 1200 of FIG. 12) between the video clips by determining the lowest edge weight in order to emphasize any combination of scene diversity/homogeneity and camera shot diversity/homogeneity.

At block 1412, the device may present the video sequence (e.g., as an available video for selection by the users 1304 of FIG. 13). For example, the video sequence may be available for presentation on a product page for the product represented as an object in the video clips of the video sequence (e.g., and shown in the still frame images used to generate the video clips).

The descriptions herein are not meant to be limiting.

Figure 15:
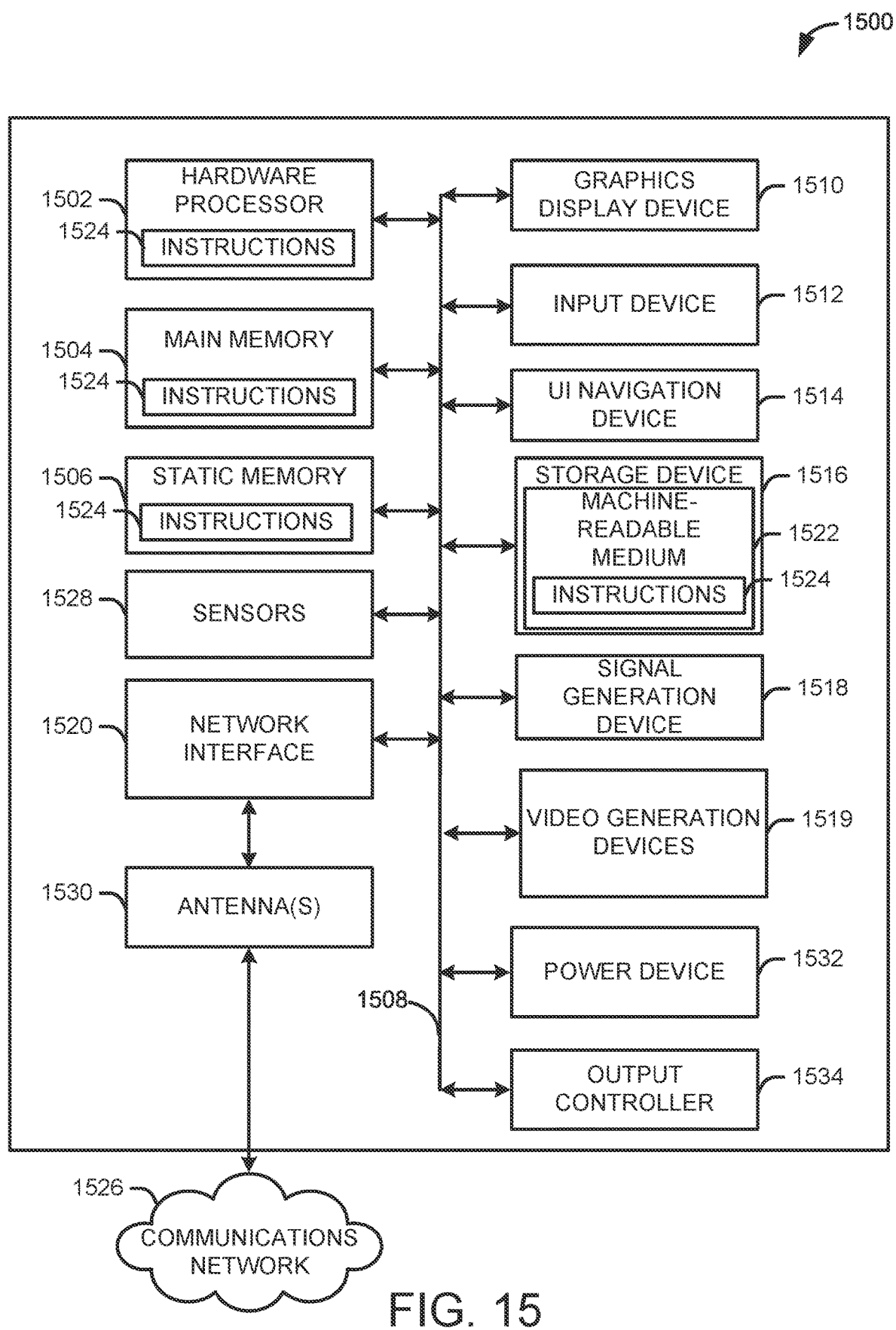
FIG. 15 illustrates a block diagram of an example machine upon which any of one or more techniques (e.g., methods) may be performed, in accordance with one or more example embodiments of the present disclosure.

FIG. 15 illustrates a block diagram of an example of a machine 1500 (e.g., the devices 1302 of FIG. 13, the remote system 1306 of FIG. 13) or system upon which any one or more of the techniques (e.g., methodologies) discussed herein may be performed. In other embodiments, the machine 1500 may operate as a standalone device or may be connected (e.g., networked) to other machines. In a networked deployment, the machine 1500 may operate in the capacity of a server machine, a client machine, or both in server-client network environments. The machine 1500 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1500 may include a hardware processor 1502 (e.g., a central processing unit (CPU), a graphics processing unit (GPU), a hardware processor core, or any combination thereof), a tensor processing unit (TPU), a main memory 1504 and a static memory 1506, some or all of which may communicate with each other via an interlink (e.g., bus) 1508. The machine 1500 may further include a power management device 1532, a graphics display device 1510, an alphanumeric input device 1512 (e.g., a keyboard), and a user interface (UI) navigation device 1514 (e.g., a mouse). In an example, the graphics display device 1510, alphanumeric input device 1512, and UI navigation device 1514 may be a touch screen display. The machine 1500 may additionally include a storage device (i.e., drive unit) 1516, a signal generation device 1518, one or more video generation devices 1519 (e.g., capable of performing steps according to FIGS. 1, 2, 5A, 5B, and 14, and representing components of the remote system 1306 of FIG. 13, such as the object detection network 1310, the camera shot model 1312, the video clip generation modules 1314, the ML models 160, the sequence model or trellis graph 170, and the product page modules 1324), a network interface device/transceiver 1520 coupled to antenna(s) 1530, and one or more sensors 1528, such as a microphone, a global positioning system (GPS) sensor, a compass, an accelerometer, or other sensor. The machine 1500 may include an output controller 1534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within the static memory 1506, or within the hardware processor 1502 during execution thereof by the machine 1500. In an example, one or any combination of the hardware processor 1502, the main memory 1504, the static memory 1506, or the storage device 1516 may constitute machine-readable media.

While the machine-readable medium 1522 is illustrated as a single medium, the term "machine-readable medium" may include a single medium or multiple media (e.g., a centralized or distributed database, and/or associated caches and servers) configured to store the one or more instructions 1524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1500 and that cause the machine 1500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device/transceiver 1520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 1520 may include one or more physical jacks (e.g., Ethernet, coaxial, or phone jacks) or one or more antennas to connect to the communications network 1526. In an example, the network interface device/transceiver 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for generating video clips based on still frame images, the method comprising:
    identifying, by at least one processor of a device, a first image representing a first scene;
    identifying, by the at least one processor, a second image representing a second scene different than the first scene;
    generating, by the at least one processor, based on the first image, first images representing the first scene and using a first type of camera shot;
    generating, by the at least one processor, based on the second image, second images representing the second scene and using a second type of camera shot different than the first type of camera shot;
    encoding, by the at least one processor, using a first encoder network, first embeddings for a first video comprising the first images, the first embeddings indicative of features of the first scene;
    encoding, by the at least one processor, using the first encoder network, second embeddings for a second video, the second embeddings indicative of features of the second scene;
    encoding, by the at least one processor, using a second encoder network, third embeddings for the first video, the third embeddings indicative of camera shot features of the first video;
    encoding, by the at least one processor, using the second encoder network, fourth embeddings for the second video, the fourth embeddings indicative of camera shot features of the second video; and
    generating, by the at least one processor, using machine learning models, based on the first embeddings, the second embeddings, the third embeddings, and the fourth embeddings, a video sequence comprising one of the first video or the second video.

2. The method of claim 1, further comprising:
    determining a scene similarity between the first video and the second video based on a comparison of the first embeddings to the second embeddings; and
    determining a camera shot similarity between the first video and the second video based on a comparison of the third embeddings to the fourth embeddings,
    wherein generating the video sequence is further based on the scene similarity and on the camera shot similarity.

3. The method of claim 1, further comprising:
- generating a trellis graph comprising the first video, the second video, and a third video as nodes connected by edges, the third video comprising third images; and
- generating the edges based on a sum of a camera shot similarity between two respective nodes and 1 minus a scene similarity between the respective nodes,
- wherein generating the video sequence is further based on the edges,
- wherein the scene similarity is based on a comparison of the first embeddings to the second embeddings, and
- wherein the camera shot similarity is based on a comparison of the third embeddings to the fourth embeddings.

4. The method of claim 3, wherein the edges comprise a first edge between the first video and the second video, a second edge between the first video and the third video, and a third edge between the second video and the third video, the method further comprising:
- determining that the sum for the first edge is less than the sum for the second edge and the sum for the third edge,
- wherein generating the video sequence is further based on determining that the sum for the first edge is less than the sum for the second edge and the sum for the third edge.

5. A method for generating video clips based on still frame images, the method comprising:
- encoding, by at least one processor of a device, using a first encoder network, first embeddings for a first video comprising first images at a first scene, the first embeddings indicative of features of the first scene;
- encoding, by the at least one processor, using the first encoder network, second embeddings for a second video comprising second images at a second scene, the second embeddings indicative of features of the second scene;
- encoding, by the at least one processor, using a second encoder network, third embeddings for the first video, the third embeddings indicative of features of a first type of camera shot used for the first images;
- encoding, by the at least one processor, using the second encoder network, fourth embeddings for the second video, the fourth embeddings indicative of features of a second type of camera shot used for the second images; and
- generating, by the at least one processor, using machine learning models, based on the first embeddings, the second embeddings, the third embeddings, and the fourth embeddings, a video sequence comprising one of the first video or the second video.

6. The method of claim 5, further comprising:
- determining, using the machine learning models, a scene similarity between the first video and the second video based on a comparison of the first embeddings to the second embeddings; and
- determining, using the machine learning models, a camera shot similarity between the first video and the second video based on a comparison of the third embeddings to the fourth embeddings,
- wherein generating the video sequence is further based on the scene similarity and on the camera shot similarity.

7. The method of claim 5, further comprising:
- identifying a first image representing the first scene;
- identifying a second image representing the second scene, wherein the second scene is different than the first scene;
- generating, based on the first image, the first images by simulating the first type of camera shot; and
- generating, based on the second image, the second images by simulating the second type of camera shot.

8. The method of claim 5, further comprising:
- encoding, using the first encoder network, fifth embeddings for a third video comprising third images, the fifth embeddings indicative of features of a third scene of the third images; and
- encoding, using the second encoder network, sixth embeddings for the third video, the sixth embeddings indicative of features of a third type of camera shot used by the third images,
- wherein generating the video sequence is further based on the fifth embeddings and the sixth embeddings.

9. The method of claim 8, wherein the third images are at the first scene, the method further comprising:
- determining a first scene similarity between the first images and the third images based on a comparison of the first embeddings to the fifth embeddings; and
- determining a second scene similarity between the second images and the third images based on a comparison of the second embeddings to the fifth embeddings,
- wherein the first scene similarity is greater than the second scene similarity, and
- wherein generating the video sequence is further based on the first scene similarity being greater than the second scene similarity.

10. The method of claim 8, wherein the third images use the second type of camera shot, the method further comprising:
- determining a first camera shot similarity between the first images and the third images based on a comparison of the third embeddings to the sixth embeddings; and
- determining a second camera shot similarity between the second images and the third images based on a comparison of the fourth embeddings to the sixth embeddings,
- wherein the second camera shot similarity is greater than the first camera shot similarity, and
- wherein generating the video sequence is further based on the first camera shot similarity being greater than the second camera shot similarity.

11. The method of claim 8, further comprising:
- generating a trellis graph comprising the first video, the second video, and the third video as nodes connected by edges; and
- generating the edges based on a sum of a camera shot similarity between two respective nodes and 1 minus a scene similarity between the respective nodes,
- wherein generating the video sequence is further based on the edges.

12. The method of claim 11, wherein the edges comprise a first edge between the first video and the second video, a second edge between the first video and the third video, and a third edge between the second video and the third video, the method further comprising:
- determining that the sum for the first edge is less than the sum for the second edge and the sum for the third edge,
- wherein generating the video sequence is further based on determining that the sum for the first edge is less than the sum for the second edge and the sum for the third edge.

13. The method of claim 11, wherein the sum further comprises a value indicative of video resolution.

14. The method of claim 5, wherein the first type of camera shot is one of a zoom-in, a zoom-out, a tilt from down to up, a tilt from up to down, an angular zoom left, an angular zoom right, a pan from right to left, or a pan from left to right.

15. A system for generating video clips based on still frame images, the system comprising:
   a first encoder network associated with similarities between scenes;
   a second encoder network associated with similarities between camera shots; and
   memory coupled to at least one processor of a device, the at least one processor configured to:
   encode, using the first encoder network, first embeddings for a first video comprising first images at a first scene, the first embeddings indicative of features of the first scene;
   encode, using the first encoder network, second embeddings for a second video comprising second images at a second scene, the second embeddings indicative of features of the second scene;
   encode, using the second encoder network, third embeddings for the first video, the third embeddings indicative of features of a first type of camera shot used for the first images;
   encode, using the second encoder network, fourth embeddings for the second video, the fourth embeddings indicative of features of a second type of camera shot used for the second images; and
   generate, using machine learning models, based on the first embeddings, the second embeddings, the third embeddings, and the fourth embeddings, a video sequence, the video sequence comprising the first video and the second video.

16. The system of claim 15, wherein the at least one processor is further configured to:
   determine, using the machine learning models, a scene similarity between the first video and the second video based on a comparison of the first embeddings to the second embeddings; and
   determine, using the machine learning models, a camera shot similarity between the first video and the second video based on a comparison of the third embeddings to the fourth embeddings,
   wherein to generate the video sequence is further based on the scene similarity and on the camera shot similarity.

17. The system of claim 15, wherein the at least one processor is further configured to:
   identify a first image representing the first scene;
   identify a second image representing the second scene, wherein the second scene is different than the first scene;
   generate, based on the first image, the first images by simulating the first type of camera shot; and
   generate, by the at least one processor, based on the second image, the second images by simulating the second type of camera shot.

18. The system of claim 15, wherein the at least one processor is further configured to:
   encode, using the first encoder network, fifth embeddings for a third video comprising third images, the third embeddings indicative of features of a third scene of the third images; and
   encode, using the second encoder network, sixth embeddings for the third video, the sixth embeddings indicative of features of a third type of camera shot used by the third images,
   wherein to generate the video sequence is further based on the fifth embeddings and the sixth embeddings.

19. The system of claim 18, wherein the third images are at the first scene, and wherein the at least one processor is further configured to:
   determine a first scene similarity between the first images and the third images based on a comparison of the first embeddings to the fifth embeddings; and
   determining a second scene similarity between the second images and the third images based on a comparison of the second embeddings to the fifth embeddings,
   wherein the first scene similarity is greater than the second scene similarity, and
   wherein to generate the video sequence is further based on the first scene similarity being greater than the second scene similarity.

20. The system of claim 18, wherein the at least one processor is further configured to:
   generate a trellis graph comprising the first video, the second video, and the third video as nodes connected by edges; and
   generate the edges based on a sum of a camera shot similarity between two respective nodes and 1 minus a scene similarity between the respective nodes,
   wherein to generate the video sequence is further based on the edges.

* * * * *